US006550603B1

(12) United States Patent
Beach et al.

(10) Patent No.: US 6,550,603 B1
(45) Date of Patent: Apr. 22, 2003

(54) ROTATING BELT DIVERTER

(75) Inventors: Eric Beach, Owego, NY (US); Patrick J. Fitzgibbons, Owego, NY (US); Gerald R. Mertson, Owego, NY (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/644,362

(22) Filed: Aug. 23, 2000

(51) Int. Cl.[7] .......................... B65G 47/34; B65G 47/44

(52) U.S. Cl. ............... 198/360; 198/369.2; 198/370.05; 198/370.1; 198/592; 198/817

(58) Field of Search ............................. 198/367, 367.1, 198/360, 369.2, 370.05, 370.1; 271/302, 303, 305

(56) References Cited

U.S. PATENT DOCUMENTS 4,050,573 A 9/1977 Mueller
4,424,966 A * 1/1984 Chandhoke .............. 198/369.2
4,598,814 A 7/1986 Felder
4,733,768 A 3/1988 Aquino
4,756,399 A * 7/1988 Scata ...................... 198/369.2
4,852,715 A * 8/1989 Kmetz ........................ 198/370
5,188,210 A 2/1993 Malow
5,732,609 A * 3/1998 Mschke ...................... 83/92.1

* cited by examiner

*Primary Examiner*—Christopher P. Ellis
*Assistant Examiner*—Mark A. Deuble
(74) *Attorney, Agent, or Firm*—Perkins, Smith & Cohen LLP; Harvey Kaye; Jacob N. Erlich

(57) ABSTRACT

A diverter for a conveying system which includes a belt conveyor moving along a longitudinal conveying path for transporting flat articles, including a longitudinal conveying path which includes a series of moving belts for moving flat articles therealong. There is a bin for collecting diverted flat articles. A hinged diverter gate is provided above or just forward of the bin for providing a diverting surface of moving belts which, in a first position, allows flat articles to move therealong, and, in a second position, allows the flat articles to move into the bin into which the flat articles are diverted. The bin is located beneath the conveying path and the articles are moved into the bin by the moving belts when the diverter is in its second position. The gate is hinged at a point which is different than the axis of the drive rollers so that the movement of the belts assists the upward movement of the gate when a flat article is to be diverted into the bin below.

11 Claims, 5 Drawing Sheets

ROTATING BELT DIVERTER

FIELD OF THE INVENTION

The present invention relates generally to the conveyor art, and, more particularly, to a conveyor section for diverting articles using a belt diverter.

BACKGROUND OF THE INVENTION

U.S. Pat. No. 4,050,573 discloses two receiving conveyors which extend at opposite sides of the longitudinal axis of the intake conveyor.

U.S. Pat. No. 4,598,814 discloses articles being transported in a horizontal plane and having diverters.

U.S. Pat. No. 4,733,768 discloses a diverting device for diverting an individual cookie from one conveyor to another location.

U.S. Pat. No. 5,188,210 discloses a conveyor having vertical side conveyors and has a diverter, the flat mail being disposed in a vertical plane.

There is a problem in the prior art in that the flat paper mail is to maintain movement at a constant speed over a pocket diverter in a mail sorter which has the transport in the horizontal plane. Particularly when dealing with "flat" mail, which will inherently require a longer diverter, the friction between the mail piece and the diverter will slow the mail piece down causing subsequent pieces to catch up. This changes the spacing of the mail making tracking impossible and potentially causing jams. Also, there is a large variation of mail pieces and also such a variation of frictional forces. In the prior art it is difficult if not impossible to maintaing the flat articles at a constant velocity. This makes tracking difficult if not impossible. The diverter need to be larger or longer due to the flat mail specifications. Most of the traditional diverters are solid and of one piece. Also, the trailing mail pieces can catch up to the leading mail pieces thereby causing jams.

Having a movable section of a horizontal transport divert down is cumbersome due to the mass of the transport that is being moved.

SUMMARY OF THE INVENTION

It is an object of the present invention to provide a simple, inexpensive device which will divert selected flat articles.

It is another object of the present invention to provide such a device which does this less expensively and more quickly than prior art devices.

A further object of the present invention is to provide such a device with a robust mechanical design and robust control arrangement.

It is a still further object of the present invention to provide such a device in which the drive for the diverted flat articles is arranged so that the driving of the belts assists the movement of the diverter.

It is yet another object of the present invention to provide a flat mail diverter in which the horizontal transport is not moved when the mail is diverted.

An object of the invention is also to provide a diverter in which diverter gates are used to divert the flat mail and the transport remains horizontal.

These and other objects are accomplished by a system which has diverter gates with moving belts and the diverter becomes an integral part of transport. The diverter serves two functions, to divert mail and transport mail along the transport path. Narrow belts are used which are staggered with fixed transport. Idler rollers of a fixed transport are used to drive the diverter belts. Small rollers are provided at the leading edges of the diverters and the belts move over there rollers. The parts are of molded structural foam although other materials are possible. Also, the shaft and wear plates under belt path are molded in.

This construction provides the following advantages and features. No additional drive shaft or drive roller is required. The pretension in the belts helps to lift the diverter due to there being different pivot centers for the drive rollers and the diverter pivot. There are very few parts, only three for the subassembly. They are: the diverter, the rollers, and the belts. Also, the device is lightweight, weighing only 60 oz and is rapidly actuated, requiring an opening time of only 80–90 milli-seconds.

There is minimal diverting force required of approx. 13 lbs, and ¾" bore × ¾" stroke. It is inexpensive, since the diverter can be made for $32, the rollers for $10–15, and the belts for $1.20.

The present invention provides a solution which is better than the prior art because moving a section of transport requires a lot of energy or force due to the mass involved. The present invention does effectively makes the diverter an integral part of the transport but in a manner that keeps the mass and diverter energy to a minimum. This is done by using a structural foam for the material and the natural pretension in the transport belts to help lift the diverter.

The present invention solves the problem by incorporating rotating belts into the diverter of a mail sorter which utilizes a horizontal paper transport. Eliminating the problem of changes in speed and gap of the mail pieces.

The same rotating belts that are part of the fixed (stationary) transport are used in the diverter. This is accomplished by placing small transport rollers into the leading edge of each diverter gate and then installing transport belts around them and back around the stationary transport idler roller. Wrapping the belts around this idler roller instead of placing additional rollers at the trailing edge of the diverter accomplishes several benefits. Reduces the weight of the diverter, requires no additional drive pulley (driven from the stationary transport section) and allows the pretension of the belts to help lift the diverter.

The diverter of the present invention is part of a flat mail (USPS specifications.) transport which is conveying the mail in a horizontal plane. Diverters are required in order to sort the mail into "pockets" located below the transport. Rotating belts are added to the diverter gate in order to keep the mail moving at a constant velocity. The rotating belts, as part of the diverter gate, is the key feature of the design. Without the rotating belts the frictional forces acting on the mail as it goes over the diverter gate would slow the mail pieces down causing the trailing mail pieces to catch up the previous piece. The situation is aggravated by the large variation in the mail specifications (size, weight, material, and the like).

The manner in which the diverter belts are driven is another unique feature of the design. By wrapping the belts around the idler roller (adjacent to the trailing edge of the diverter gate) of the fixed portion of the transport no additional drive mechanism is required. The main advantage to this design is that no additional weight, other than the belts, has been added to the diverter. Weight is the key factor in getting the opening/closing time required.

Another design advantage is obtained as a secondary benefit from the "belt drive method" described above. Due to the different pivot centers of the diverter gate and the belts around the fixed transport idler roller the belts themselves actually help lift the diverter gate. This additional lift force is proportional to the belt pretension.

Design simplicity is a further benefit to the design. In one embodiment there are only three parts (and/or subassemblies): the diverter gate (molded assembly); belt rollers (five); and the belts (five).

Other objects, features and advantages will be apparent from the following detailed description of preferred embodiments taken in conjunction with the accompanying drawings in which:

DETAILED DESCRIPTION OF THE PREFERRED EMBODIMENTS

In the prior art it is difficult if not impossible to maintain the flat articles at a constant velocity. This makes tracking difficult. The diverters therefore need to be larger or longer than other types of diverters due to the flat mail specifications. Most of the traditional diverters are solid and of one piece. Also, the trailing mail pieces can catch up to the leading mail pieces thereby causing jams.

The present invention provides a diverter section 10 for a conveyor system in which flat paper articles, such as mail, are to be maintained at a constant speed in the direction indicated by arrow M over pocket diverters 12 in a flat article sorting system which has the transport in the horizontal plane. When dealing with "flat" mail articles, a longer diverter is inherently required, and the friction between the mail piece and the diverter surface will slow the mail piece down causing subsequent pieces to catch up to the mail piece. This changes the spacing of the mail, which makes tracking difficult or impossible and potentially causing jams. Also, there is a large variation of mail pieces and thus a variation of frictional forces.

Figure 1:
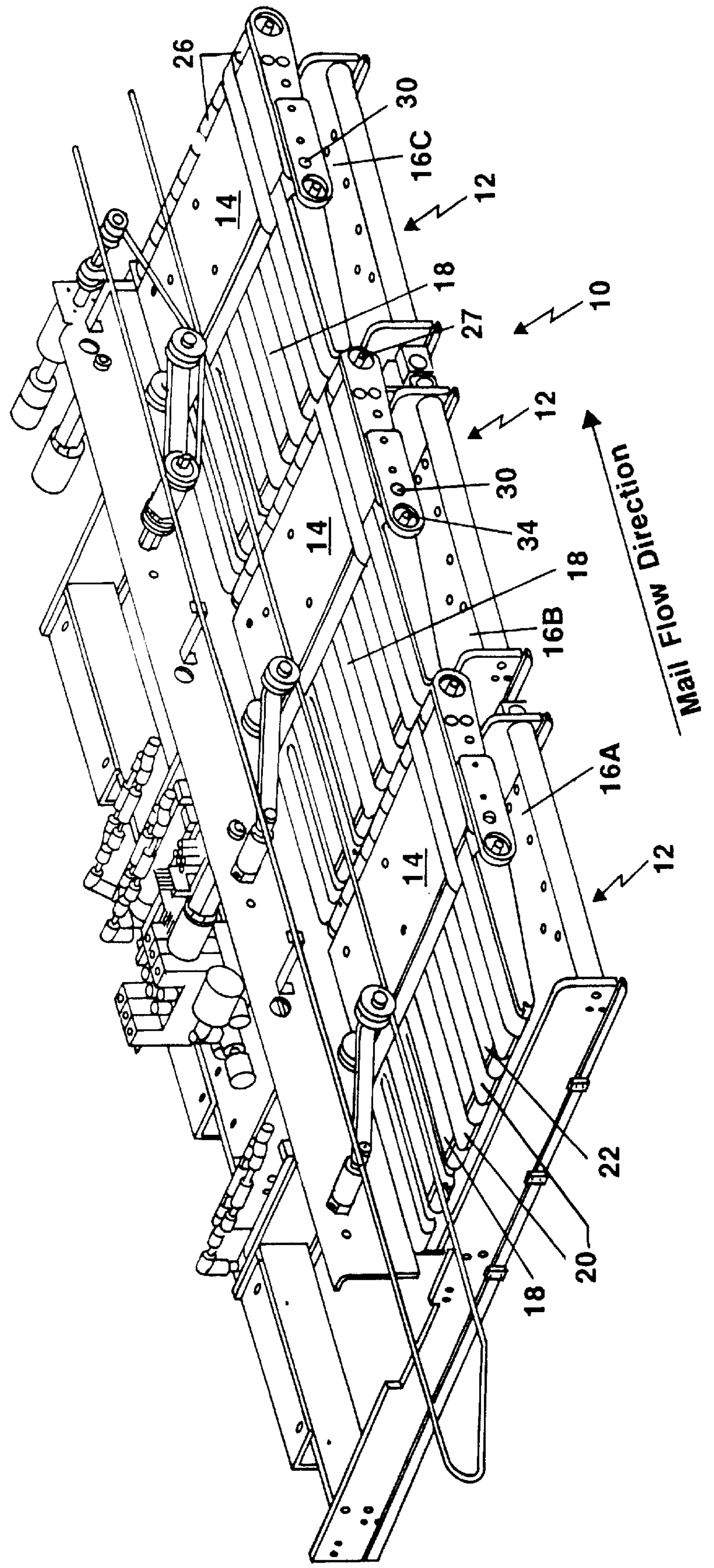
FIG. 1 is an isometric view of the diverter system of the present invention.

FIG. 1 shows three diverters 12 which comprise the diverter section 10 of this arrangement. Between diverters 12 there are fixed transport sections 14 so that in the ordinary course of operation the mail enters from the left and is moved in the direction of arrow M by the belts on the diverters 12 and on the transport sections 14 and, if not diverted, leaves the diverter section 10 on the right. In the event a particular piece of mail is to be diverted, the automatic system (not shown) which is associated with the mail sorting system and the diverter system, determines which piece is to be diverted and into which diverter bin 16A, 16B or 16C, it is to be placed. Prior to the selected piece of mail reaching the selected diverter 12, its diverter gate 18 is raised so that the mail is moved under the gate 18 and falls into the bin 16.

Figure 2:
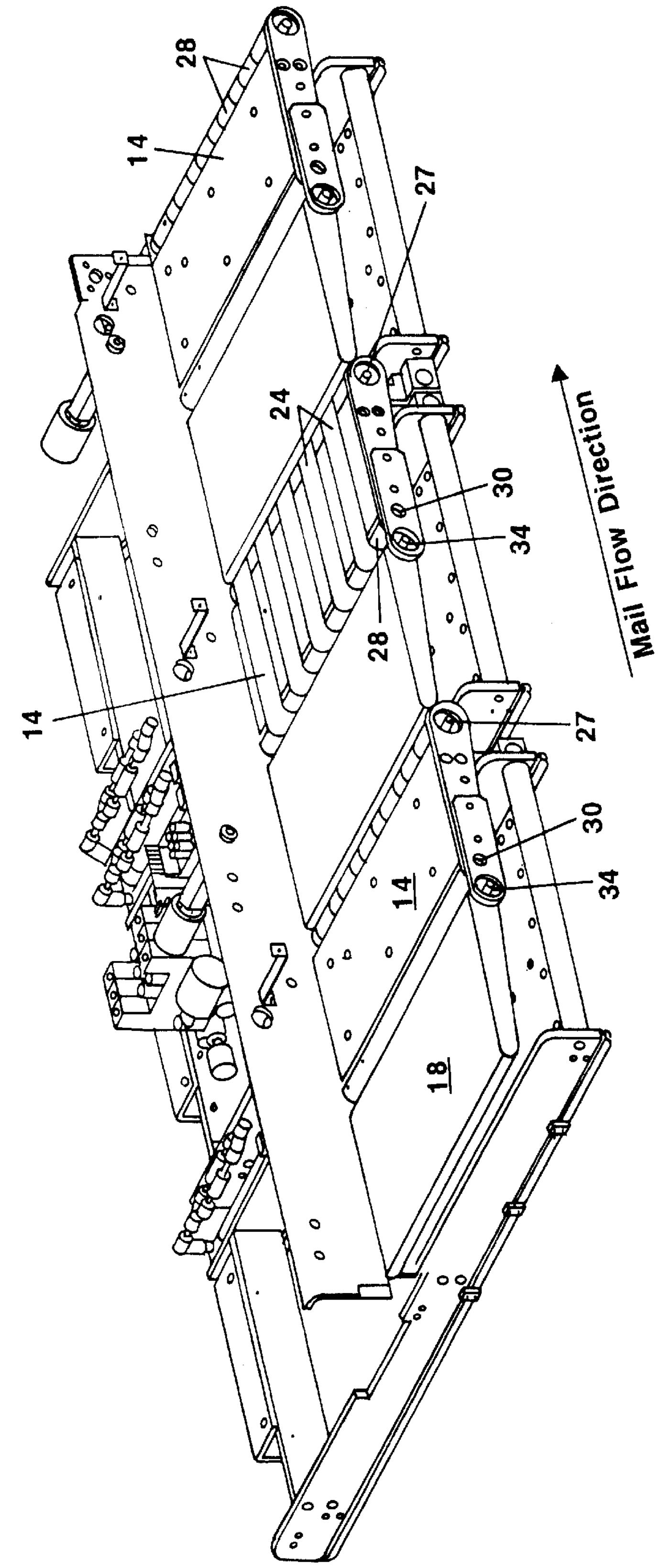
FIG. 2 is an isometric view of the diverter system of the present invention similar to FIG. 1 with some of the parts omitted for clarity.
Figure 3:
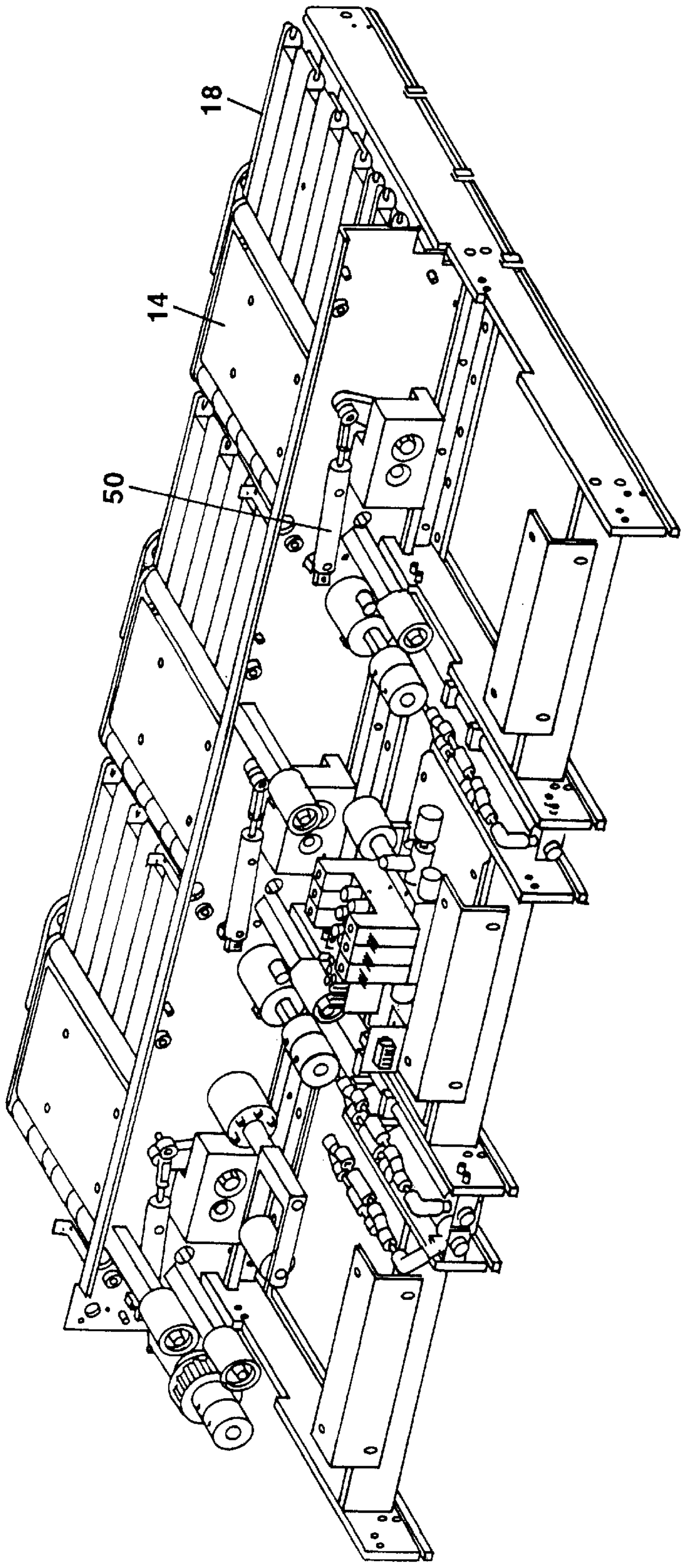
FIG. 3 is an isometric view of the diverter system of the present invention taken from a different direction than FIGS. 1 and 2.
Figure 4:
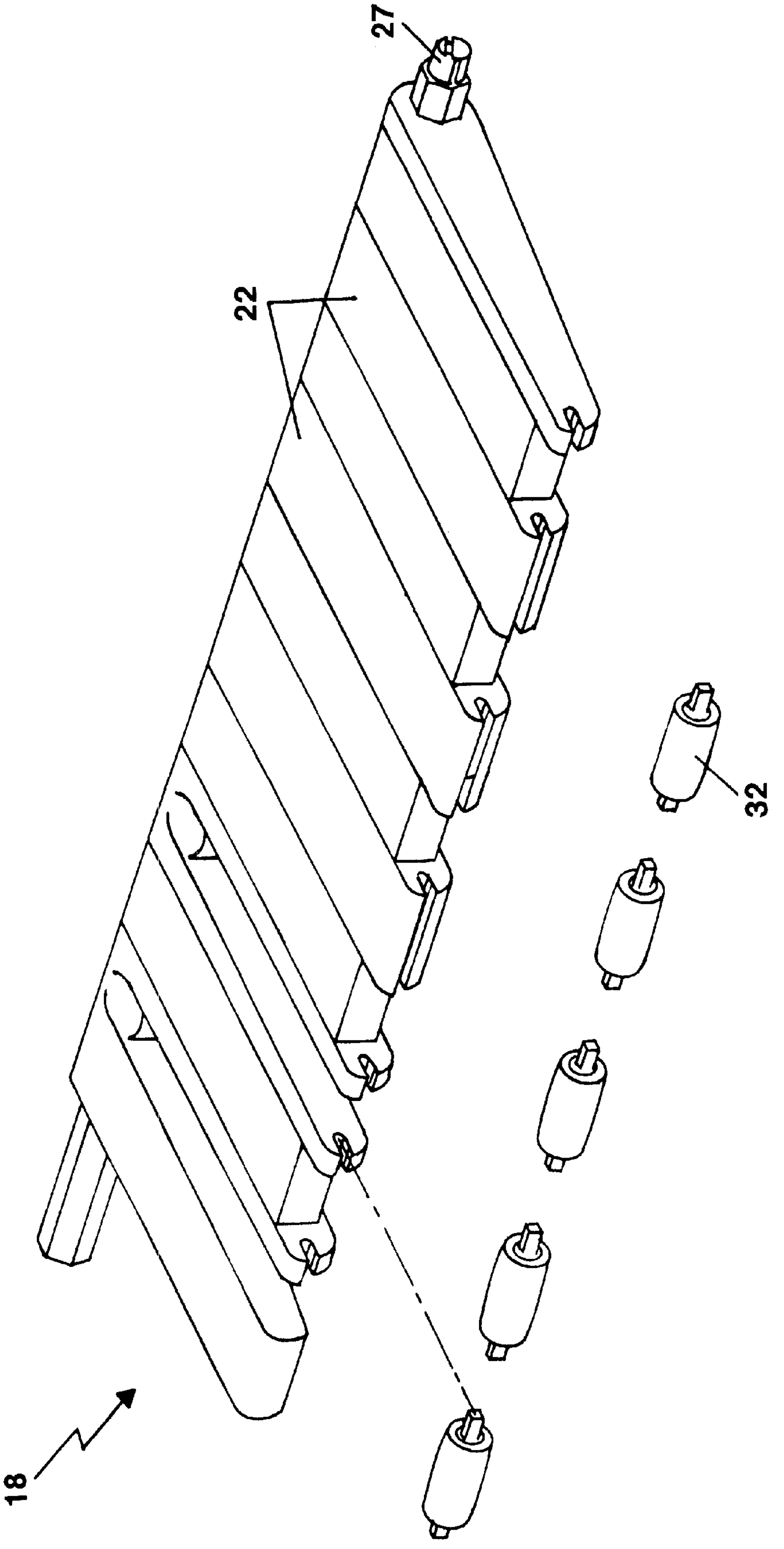
FIG. 4 is an exploded isometric view of the diverter gate showing details.
Figure 5:
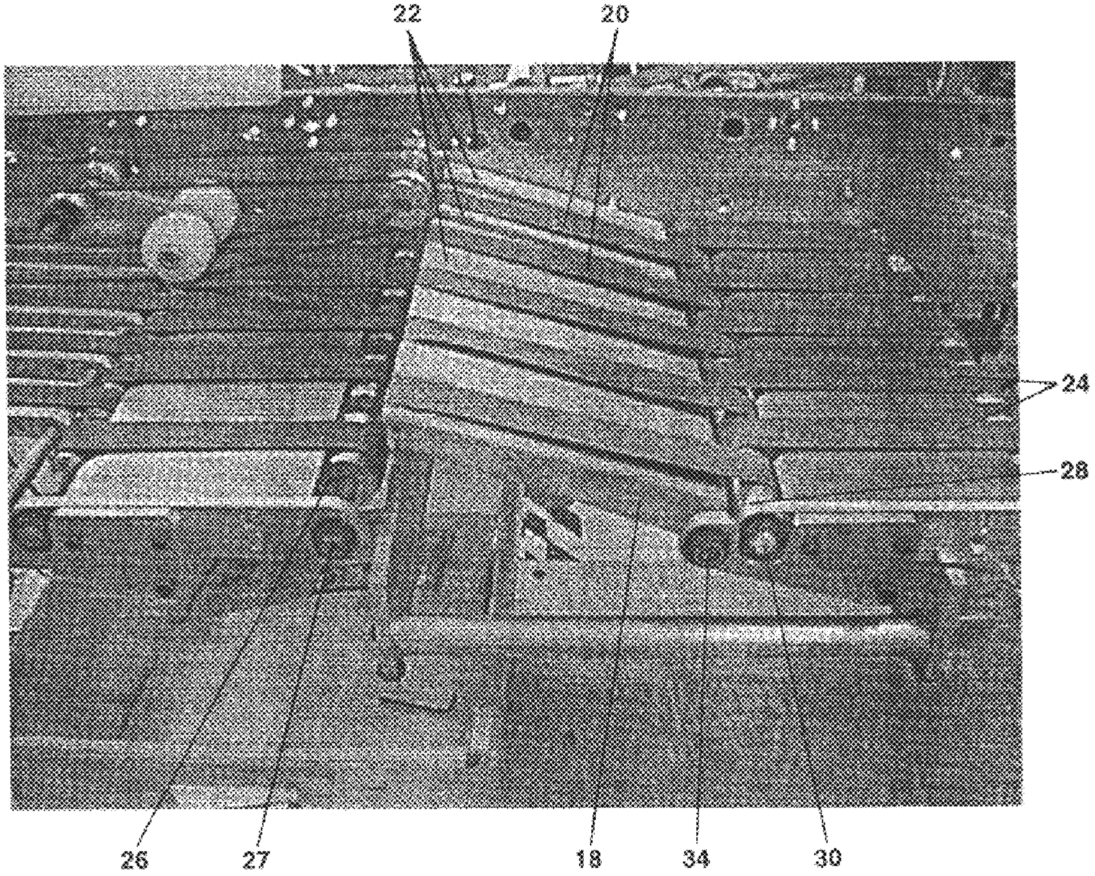
FIG. 5 is an isometric view showing one of the diverter gates in the raised position.

The diverter gates 18 have moving belts 20 and the diverters 12 become an integral part of the transport and sorting system. The diverters serve two functions; (1) to divert mail and (2) to transport mail along the transport path. The belts 20 are narrow belts which are staggered with fixed sections 22 between them. The diverters 12 are staggered with fixed transport sections 14. The fixed transport sections 14 have driven belts 24 as shown in FIGS. 2 and 4. These belts 24 are not shown in FIGS. 1 and 3 for purposes of clarity. Belts 24 are driven by rollers 26, on axles 27, which are on the downstream side and have idler rolls 28 mounted on axles 30 on their upstream sides. The belts 20 on the diverter gates are driven by the idler rolls 28 of the belts 24.

The hinged gates 18 move about a hinge axle 34. Thus, the idler rollers 28 of the fixed transport sections 14 are used to drive the diverter belts 20. Small rollers 32 (see FIG. 4) are provided at the leading edges of the diverter gates and the belts 20 move over these rollers 32. The parts are of molded structural foam although other materials are possible. Also, the shaft and wear plates under the belt paths are molded in.

Air cylinders 50 are used to move the diverter gates 18 about their pivots 34 to move them upwardly when mail is to be diverterd into the bin below the gate.

This construction provides the following advantages and features. No additional drive shaft or drive roller is required. The pretension in the belts 20 helps to lift the diverter gate 18 due to there being different pivot centers for the drive rollers at 30 and the diverter pivot at 34. There are very few parts, only three for the subassembly. They are: the diverter, the rollers, and the belts. Also, the device is lightweight, weighing only 60 oz and is rapidly actuated, requiring an opening time of only 80–90 milli-seconds.

There is minimal diverting force required of approximately 13 lbs, and ¾" bore × ¾" stroke. It is inexpensive, the diverters costing approximately $32, the rollers approximately $10–15, and the belts approximately $1.20

The present invention provides a solution which is better than the prior art because moving a section of transport requires a lot of energy or force due to the mass involved. The present invention does effectively makes the diverter an integral part of the transport but in a manner that keeps the mass and divert energy to a minimum. This is done by using a structural foam for the material and the natural pretension in the transport belts to help lift the diverter.

The present invention solves the problem by incorporating rotating belts into the diverter of a mail sorter which utilizes a horizontal paper transport. Eliminating the problem of changes in speed and gap of the mail pieces.

The same rotating belts that are part of the fixed (stationary) transport are effectively incorporated into the diverter. This is accomplished by placing small transport rollers 32 into the leading edge of the diverter and then installing transport belts 20 around them and back around the stationary transport idler rollers 28. Wrapping the belts around these idler rollers 28 instead of placing additional rollers at the trailing edge of the diverter accomplishes several benefits. It reduces the weight of the diverter, requires no additional drive pulley (driven from the stationary transport section and allows the pretension of the belts to help lift the diverter.

The diverter of the present invention is part of a flat mail (USPS specs.) transport which is conveying the mail in a horizontal plane. Diverters are required in order to sort the mail into "pockets" located below the transport. Rotating belts where added to the diverter gate in order to keep the mail moving at a constant velocity. The rotating belts, as part of the diverter gate, is an important feature of the invention.

Without the rotating belts the frictional forces acting on the mail as it goes over the diverter gate would slow the mail pieces down causing the trailing mail pieces to catch up the previous piece. The situation is aggravated by the large variation in the mail spec. (size, weight, material, etc.).

The manner in which the diverter belts are being driven is another novel feature of the design. By wrapping the belts around the idler rollers 28 (adjacent to the trailing edge of the diverter gate) of the fixed portion of the transport no additional drive mechanism is required. The main advantage to this design is that no additional weight, other than the belts, has been added to the diverter. Weight is the key factor in getting the opening/closing time required.

Another design advantage is obtained as a secondary benefit from the "belt drive method" described above. Due to the different pivot centers of the diverter gate and the belts around the fixed transport idler roller the belts themselves actually help lift the diverter gate. This additional lift force is proportional to the belt pretension.

Design simplicity is the last benefit to the design. There are only 3 part numbers (and/or sub-assy.)—the diverter gate (molded assy.), belt rollers, 5 each, and the belts, 5 each.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A diverter for a conveying system which includes a belt conveyor moving along a longitudinal conveying path for transporting flat articles, comprising:

a. a longitudinal conveying path which includes a series of sections, each having moving belts for moving flat articles therealong;

c. a bin for collecting diverted flat articles;

d. at least one hinged diverter gate located between two adjacent sections and providing a diverting surface of moving belts which, in a first position allows flat articles to move therealong, and, in a second position, allows the flat articles to move into the bin into which the flat articles are diverted, the belts on the diverter gate are driven by rolls located in the adjacent downstream section whereby there is no gap between the diverter gate and the adjacent downstream section; and e. said bin being disposed beneath the conveying path whereby the articles are moved into said bin by the moving belts of the section which is upstream to the diverter gate, when the diverter gate is in its second position.

2. A diverter as defined in claim 1 wherein the rolls which drive the belts on the diverter gate are idler rolls.

3. A diverter as defined in claim 1 wherein there are rollers at the leading edges of the diverter gate and the belts move over these rollers.

4. A diverter as defined in claim 1 wherein the parts of the diverter gate are of structural foam.

5. In a diverter for a conveying system which includes a belt conveyor moving along a longitudinal conveying path for transporting flat articles, and a bin disposed beneath the conveying path for receiving diverted flat articles, the improvement comprising:

a. a longitudinal conveying path which includes a series of sections, each having moving belts for moving flat articles therealong; and b. at least one hinged diverter gate located between two adjacent sections and providing a diverting surface of moving belts which, in a first position, allows flat articles to move therealong, and, in a second position, allows the flat articles to move into a bin into which the flat articles are diverted, the belts on the diverter gate being driven by rolls located in the adjacent downstream section whereby there is no gap between the diverter gate and the adjacent downstream section.

6. The improvement of claim 5 wherein the rolls which drive the belts on the diverter gate are idler rolls.

7. The improvement of claim 5 wherein there are rollers at the leading edges of the diverter gate and the belts move over these rollers.

8. The improvement of claim 5 wherein the parts of the diverter gate are of structural foam.

9. The improvement of claim 5 wherein the rolls which drive the diverter gate belts have an axis which is remote from the hinge axis of the gate so that when the gate moves upwardly to allow an article to be diverted into a bin below it, this movement is enhanced b the movement of the belts on the gate.

10. A diverter for a conveying system which includes a belt conveyor moving along a longitudinal conveying path for transporting flat articles, comprising:

a. a longitudinal conveying path which includes a series moving belts for moving flat articles therealong;

b. a bin for collecting diverted flat articles;

b. a hinged diverter gate for providing a diverting surface of moving belts which, in a first position, allows flat articles to move therealong, and, in a second position, allows the flat articles to move into the bin into which the flat articles are diverted; and c. said bin being disposed beneath the conveying path and into which the articles are moved by the moving belts when the diverter gate is in its second position;

the belts on the diverter gate being driven by rolls located downstream and the rolls having an axis which is remote from the hinge axis of the gate so that when the gate moves upwardly to allow an article to be diverted into a bin below it, this movement is enhanced by the movement of the belts on the gate.

11. A diverter as defined in claim 10 further comprising means upstream of said diverter for recognizing an article to be rejected, and sending such information to the diverter gate.

* * * * *

UNITED STATES PATENT AND TRADEMARK OFFICE

CERTIFICATE OF CORRECTION

PATENT NO. : 6,550,603 B1
DATED : April 22, 2003
INVENTOR(S) : Eric Beach et al.

It is certified that error appears in the above-identified patent and that said Letters Patent is hereby corrected as shown below:

Column 5,
Line 37, subparagraph "c" should read -- b --.
Line 38, subparagraph "d" should read -- c --.
Line 41, a comma should be inserted between "position" and "allows" and should read -- position, allows --.
Line 48, subparagraph "e" should read -- d --.

Column 6,
Line 30, the letter "b" should read -- by --.
Line 39, subparagraph "b" should read -- c --.
Line 44, subparagraph "c" should read -- d --.

Signed and Sealed this

Ninth Day of September, 2003

JAMES E. ROGAN
*Director of the United States Patent and Trademark Office*